United States Patent
Leijon et al.

(10) Patent No.: US 6,936,947 B1
(45) Date of Patent: *Aug. 30, 2005

(54) TURBO GENERATOR PLANT WITH A HIGH VOLTAGE ELECTRIC GENERATOR

(75) Inventors: Mats Leijon, Västerås (SE); Peter Templin, Köping (SE); Claes Ivarson, Västerås (SE); Lars Gertmar, Västerås (SE); Peter Carstensen, Huddinge (SE); Bertil Larsson, Västerås (SE); Sören Berggren, Västerås (SE); Erland Sörensen, Västerås (SE); Bertil Berggren, Västerås (SE); Gunnar Kylander, Västerås (SE); Mons Hölleland, Västerås (SE)

(73) Assignee: ABB AB, Vasteras (SE)

( * ) Notice: Subject to any disclaimer, the term of this patent is extended or adjusted under 35 U.S.C. 154(b) by 0 days.

This patent is subject to a terminal disclaimer.

(21) Appl. No.: 08/952,996
(22) PCT Filed: May 27, 1997
(86) PCT No.: PCT/SE99/00886
§ 371 (c)(1),
(2), (4) Date: Apr. 10, 1998
(87) PCT Pub. No.: WO97/45924
PCT Pub. Date: Dec. 4, 1997

(30) Foreign Application Priority Data

May 29, 1996 (SE) ................................................ 9602079

(51) Int. Cl.[7] .............................. H02K 3/40; H02K 3/12
(52) U.S. Cl. ....................... 310/196; 310/179; 310/180; 310/195; 174/DIG. 19; 174/DIG. 28; 290/1 R
(58) Field of Search ................................. 310/179–180, 310/184, 195–196, 198–208, 213; 290/1 R, 4 R, 4 A–4 D, 5, 52; 174/DIG. 13–33

(56) References Cited

U.S. PATENT DOCUMENTS

| 681,800 A | 9/1901 | Lasche |
|---|---|---|
| 847,008 A | 3/1907 | Kitsee |
| 1,304,451 A | 5/1919 | Burnham |

(Continued)

FOREIGN PATENT DOCUMENTS

| AT | 399790 | 7/1995 |
|---|---|---|
| BE | 565063 | 2/1957 |
| CH | 391071 | 4/1965 |

(Continued)

OTHER PUBLICATIONS

Shipboard Electrical Insulation; G. L. Moses, 1951, pp2&3.
ABB Elkrafthandbok; ABB; ; pp274–276.
Eklraft teknisk Handbok, 2 Elmaskiner; A. Alfredsson et al; 1988, pp 121–123.
High Voltage Cables in a New Class of Generators Powerformer; M. Leijon et al; Jun. 14, 1999; pp1–8.

(Continued)

*Primary Examiner*—Burton Mullins
(74) *Attorney, Agent, or Firm*—Dykema Gossett PLLC

(57) ABSTRACT

In a plant containing a turbo-generator the magnetic circuit of the turbo-generator is included in an electric generator which directly supplies a high supply voltage of 20–800 kV, preferably higher than 36 kV. The insulation of the generator is built up of a cable (6) comprising one or more current-carrying conductors (31) with a number of strands (36) surrounded by outer and inner semiconducting layers (34, 32) and intermediate insulating layers (33). The outer semiconducting layer (34) is at earth potential. The phases of the winding are Y-connected. The Y-point may be insulated and protected from over-voltage by means of surge arresters, or else the Y-point may be earthed via a suppression filter.

38 Claims, 3 Drawing Sheets

U.S. PATENT DOCUMENTS

| | | |
|---|---|---|
| 1,418,856 A | 6/1922 | Williamson |
| 1,481,585 A | 1/1924 | Beard |
| 1,508,456 A | 9/1924 | Lenz |
| 1,728,915 A | 9/1929 | Blankenship et al. |
| 1,742,985 A | 1/1930 | Burnham |
| 1,747,507 A | 2/1930 | George |
| 1,756,672 A | 4/1930 | Barr |
| 1,762,775 A | 6/1930 | Ganz |
| 1,781,308 A | 11/1930 | Vos |
| 1,861,182 A | 5/1932 | Hendey et al. |
| 1,904,885 A | 4/1933 | Seeley |
| 1,974,406 A | 9/1934 | Apple et al. |
| 2,006,170 A | 6/1935 | Juhlin |
| 2,206,856 A | 7/1940 | Shearer |
| 2,217,430 A | 10/1940 | Baudry |
| 2,241,832 A | 5/1941 | Wahlquist |
| 2,251,291 A | 8/1941 | Reichelt |
| 2,256,897 A | 9/1941 | Davidson et al. |
| 2,295,415 A | 9/1942 | Monroe |
| 2,409,893 A | 10/1946 | Pendleton et al. |
| 2,415,652 A | 2/1947 | Norton |
| 2,424,443 A | 7/1947 | Evans |
| 2,436,306 A | 2/1948 | Johnson |
| 2,446,999 A | 8/1948 | Camilli |
| 2,459,322 A | 1/1949 | Johnston |
| 2,462,651 A | 2/1949 | Lord |
| 2,498,238 A | 2/1950 | Berberich et al. |
| 2,650,350 A | 8/1953 | Heath |
| 2,721,905 A | 10/1955 | Monroe |
| 2,749,456 A | 6/1956 | Luenberger |
| 2,780,771 A | 2/1957 | Lee |
| 2,846,599 A | 8/1958 | McAdam |
| 2,885,581 A | 5/1959 | Pileggi |
| 2,943,242 A | 6/1960 | Schaschl et al. |
| 2,947,957 A | 8/1960 | Spindler |
| 2,959,699 A | 11/1960 | Smith |
| 2,962,679 A | 11/1960 | Stratton |
| 2,975,309 A | 3/1961 | Seidner |
| 3,014,139 A | 12/1961 | Shildneck |
| 3,098,893 A | 7/1963 | Pringle et al. |
| 3,130,335 A | 4/1964 | Rejda |
| 3,143,269 A | 8/1964 | Van Eldik |
| 3,157,806 A | 11/1964 | Wiedemann |
| 3,158,770 A | 11/1964 | Coggeshall et al. |
| 3,197,723 A | 7/1965 | Dortort |
| 3,268,766 A | 8/1966 | Amos |
| 3,304,599 A | 2/1967 | Nordin |
| 3,354,331 A | 11/1967 | Broeker et al. |
| 3,365,657 A | 1/1968 | Webb |
| 3,372,283 A | 3/1968 | Jaecklin |
| 3,392,779 A | 7/1968 | Tilbrook |
| 3,411,027 A | 11/1968 | Rosenberg |
| 3,418,530 A | 12/1968 | Cheever |
| 3,435,262 A | 3/1969 | Bennett et al. |
| 3,437,858 A | 4/1969 | White |
| 3,444,407 A | 5/1969 | Yates |
| 3,447,002 A | 5/1969 | Ronnevig |
| 3,484,690 A | 12/1969 | Wald |
| 3,541,221 A | 11/1970 | Aupoix et al. |
| 3,560,777 A | 2/1971 | Moeller |
| 3,571,690 A | 3/1971 | Lataisa |
| 3,593,123 A | 7/1971 | Williamson |
| 3,631,519 A | 12/1971 | Salahshourian |
| 3,644,662 A | 2/1972 | Salahshourian |
| 3,651,244 A | 3/1972 | Silver et al. |
| 3,651,402 A | 3/1972 | Leffmann |
| 3,660,721 A | 5/1972 | Baird |
| 3,666,876 A | 5/1972 | Forster |
| 3,670,192 A | 6/1972 | Andersson et al. |
| 3,675,056 A | 7/1972 | Lenz |
| 3,684,821 A | 8/1972 | Miyauchi et al. |
| 3,684,906 A | 8/1972 | Lexz |
| 3,699,238 A | 10/1972 | Hansen et al. |
| 3,716,652 A | 2/1973 | Lusk et al. |
| 3,716,719 A | 2/1973 | Angelery et al. |
| 3,727,085 A | 4/1973 | Goetz et al. |
| 3,740,600 A | 6/1973 | Turley |
| 3,743,867 A | 7/1973 | Smith, Jr. |
| 3,746,954 A | 7/1973 | Myles et al. |
| 3,758,699 A | 9/1973 | Lusk et al. |
| 3,778,891 A | 12/1973 | Amasino et al. |
| 3,781,739 A | 12/1973 | Meyer |
| 3,787,607 A | 1/1974 | Schlafly |
| 3,792,399 A | 2/1974 | McLyman |
| 3,801,843 A | 4/1974 | Corman et al. |
| 3,809,933 A | 5/1974 | Sugawara et al. |
| 3,813,764 A | 6/1974 | Tanaka et al. |
| 3,828,115 A | 8/1974 | Hvizd, Jr. |
| 3,881,647 A | 5/1975 | Wolfe |
| 3,884,154 A | 5/1975 | Marten |
| 3,891,880 A | 6/1975 | Britsch |
| 3,902,000 A | 8/1975 | Forsyth et al. |
| 3,912,957 A | 10/1975 | Reynolds |
| 3,932,779 A | 1/1976 | Madsen |
| 3,932,791 A | 1/1976 | Oswald |
| 3,943,392 A | 3/1976 | Keuper et al. |
| 3,947,278 A | 3/1976 | Youtsey |
| 3,965,408 A | 6/1976 | Higuchi et al. |
| 3,968,388 A | 7/1976 | Lambrecht et al. |
| 3,971,543 A | 7/1976 | Shanahan |
| 3,974,314 A | 8/1976 | Fuchs |
| 3,993,860 A | 11/1976 | Snow et al. |
| 3,995,785 A | 12/1976 | Arick et al. |
| 4,001,616 A | 1/1977 | Lonseth et al. |
| 4,008,367 A | 2/1977 | Sunderhauf |
| 4,008,409 A | 2/1977 | Rhudy et al. |
| 4,031,310 A | 6/1977 | Jachimowicz |
| 4,039,740 A | 8/1977 | Iwata |
| 4,041,431 A | 8/1977 | Enoksen |
| 4,047,138 A | 9/1977 | Steigerwald |
| 4,064,419 A | 12/1977 | Peterson |
| 4,084,307 A | 4/1978 | Schultz et al. |
| 4,085,347 A | 4/1978 | Lichius |
| 4,088,953 A | 5/1978 | Sarian |
| 4,091,138 A | 5/1978 | Takagi et al. |
| 4,091,139 A * | 5/1978 | Quirk ........................ 428/244 |
| 4,099,227 A | 7/1978 | Liptak |
| 4,103,075 A | 7/1978 | Adam |
| 4,106,069 A | 8/1978 | Trautner et al. |
| 4,107,092 A | 8/1978 | Carnahan et al. |
| 4,109,098 A * | 8/1978 | Olsson et al. ................ 174/106 |
| 4,121,148 A | 10/1978 | Platzer |
| 4,132,914 A | 1/1979 | Khutoretsky |
| 4,134,036 A | 1/1979 | Curtiss |
| 4,134,055 A | 1/1979 | Akamatsu |
| 4,134,146 A | 1/1979 | Stetson |
| 4,149,101 A | 4/1979 | Lesokhin et al. |
| 4,152,615 A | 5/1979 | Calfo et al. |
| 4,160,193 A | 7/1979 | Richmond |
| 4,164,672 A | 8/1979 | Flick |
| 4,164,772 A | 8/1979 | Hingorani |
| 4,177,397 A | 12/1979 | Lill |
| 4,177,418 A | 12/1979 | Brueckner et al. |
| 4,184,186 A | 1/1980 | Barkan |
| 4,200,817 A | 4/1980 | Bratoljic |
| 4,200,818 A | 4/1980 | Ruffing et al. |
| 4,206,434 A | 6/1980 | Hase |
| 4,207,427 A | 6/1980 | Beretta et al. |
| 4,207,482 A | 6/1980 | Neumeyer et al. |
| 4,208,597 A | 6/1980 | Mulach et al. |
| 4,229,721 A | 10/1980 | Koloczek et al. |

| | | |
|---|---|---|
| 4,238,339 A | 12/1980 | Khutoretsky et al. |
| 4,239,999 A | 12/1980 | Vinokurov et al. |
| 4,245,182 A | 1/1981 | Aotsu et al. |
| 4,246,694 A | 1/1981 | Raschbichler et al. |
| 4,255,684 A | 3/1981 | Mischler et al. |
| 4,258,280 A | 3/1981 | Starcevic |
| 4,262,209 A | 4/1981 | Berner |
| 4,274,027 A | 6/1981 | Higuchi et al. |
| 4,281,264 A | 7/1981 | Keim et al. |
| 4,292,558 A | 9/1981 | Flick et al. |
| 4,307,311 A | 12/1981 | Grozinger |
| 4,308,476 A * | 12/1981 | Schuler ................ 310/45 |
| 4,308,575 A | 12/1981 | Mase |
| 4,310,966 A | 1/1982 | Breitenbach |
| 4,314,168 A | 2/1982 | Breitenbach |
| 4,317,001 A | 2/1982 | Silver et al. |
| 4,320,645 A | 3/1982 | Stanley |
| 4,321,426 A | 3/1982 | Schaeffer et al. |
| 4,321,518 A | 3/1982 | Akamatsu |
| 4,330,726 A | 5/1982 | Albright et al. |
| 4,337,922 A | 7/1982 | Streiff et al. |
| 4,341,989 A | 7/1982 | Sandberg et al. |
| 4,347,449 A | 8/1982 | Beau |
| 4,347,454 A | 8/1982 | Gellert et al. |
| 4,353,612 A | 10/1982 | Meyers |
| 4,357,542 A | 11/1982 | Kirschbaum |
| 4,360,749 A | 11/1982 | Neumann et al. |
| 4,361,723 A | 11/1982 | Hvizd, Jr. et al. |
| 4,365,178 A | 12/1982 | Lexz |
| 4,367,425 A | 1/1983 | Mendelsohn et al. |
| 4,367,890 A | 1/1983 | Spirk |
| 4,368,418 A | 1/1983 | Demello et al. |
| 4,369,389 A | 1/1983 | Lambrecht |
| 4,371,745 A | 2/1983 | Sakashita |
| 4,384,944 A | 5/1983 | Silver et al. |
| 4,387,316 A | 6/1983 | Katsekas |
| 4,401,920 A | 8/1983 | Taylor et al. |
| 4,403,163 A | 9/1983 | Rarmerding et al. |
| 4,404,486 A | 9/1983 | Keim et al. |
| 4,411,710 A | 10/1983 | Mochizuki et al. |
| 4,421,284 A | 12/1983 | Pan |
| 4,425,521 A | 1/1984 | Rosenberry, Jr. et al. |
| 4,426,771 A | 1/1984 | Wang et al. |
| 4,429,244 A * | 1/1984 | Nikitin et al. ............ 310/254 |
| 4,431,960 A | 2/1984 | Zucker |
| 4,432,029 A | 2/1984 | Lundqvist |
| 4,437,464 A | 3/1984 | Crow |
| 4,443,725 A | 4/1984 | Derderian et al. |
| 4,470,884 A | 9/1984 | Carr |
| 4,473,765 A | 9/1984 | Butman, Jr. et al. |
| 4,475,075 A | 10/1984 | Munn |
| 4,477,690 A | 10/1984 | Nikitin et al. |
| 4,481,438 A | 11/1984 | Keim |
| 4,484,106 A | 11/1984 | Taylor et al. |
| 4,488,079 A | 12/1984 | Dailey et al. |
| 4,490,651 A | 12/1984 | Taylor et al. |
| 4,503,284 A | 3/1985 | Minnick et al. |
| 4,508,251 A | 4/1985 | Harada et al. |
| 4,510,077 A | 4/1985 | Elton |
| 4,517,471 A | 5/1985 | Sachs |
| 4,520,287 A | 5/1985 | Wang et al. |
| 4,523,249 A | 6/1985 | Arimoto |
| 4,538,131 A | 8/1985 | Baier et al. |
| 4,546,210 A | 10/1985 | Akiba et al. |
| 4,551,780 A | 11/1985 | Canay |
| 4,557,038 A | 12/1985 | Wcislo et al. |
| 4,560,896 A | 12/1985 | Vogt et al. |
| 4,565,929 A | 1/1986 | Baskin et al. |
| 4,571,453 A | 2/1986 | Takaoka et al. |
| 4,588,916 A | 5/1986 | Lis |
| 4,590,416 A | 5/1986 | Porche et al. |
| 4,594,630 A | 6/1986 | Rabinowitz et al. |
| 4,607,183 A | 8/1986 | Rieber et al. |
| 4,615,109 A | 10/1986 | Wcislo et al. |
| 4,615,778 A | 10/1986 | Elton |
| 4,618,795 A | 10/1986 | Cooper et al. |
| 4,619,040 A | 10/1986 | Wang et al. |
| 4,622,116 A | 11/1986 | Elton et al. |
| 4,633,109 A | 12/1986 | Feigel |
| 4,650,924 A | 3/1987 | Kauffman et al. |
| 4,652,963 A | 3/1987 | Fahlen |
| 4,656,316 A | 4/1987 | Meltsch |
| 4,656,379 A | 4/1987 | McCarty |
| 4,677,328 A | 6/1987 | Kumakura |
| 4,687,882 A | 8/1987 | Stone et al. |
| 4,692,731 A * | 9/1987 | Osinga ................ 335/299 |
| 4,723,083 A | 2/1988 | Elton |
| 4,723,104 A | 2/1988 | Rohatyn |
| 4,724,345 A | 2/1988 | Elton et al. |
| 4,732,412 A | 3/1988 | van der Linden et al. |
| 4,737,704 A | 4/1988 | Kalinnikov et al. |
| 4,745,314 A | 5/1988 | Nakano |
| 4,761,602 A | 8/1988 | Leibovich |
| 4,766,365 A | 8/1988 | Bolduc et al. |
| 4,771,168 A | 9/1988 | Gundersen et al. |
| 4,785,138 A | 11/1988 | Breitenbach et al. |
| 4,795,933 A | 1/1989 | Sakai |
| 4,827,172 A | 5/1989 | Kobayashi |
| 4,845,308 A | 7/1989 | Womack, Jr. et al. |
| 4,847,747 A | 7/1989 | Abbondanti |
| 4,853,565 A | 8/1989 | Elton et al. |
| 4,859,810 A | 8/1989 | Cloetens et al. |
| 4,859,989 A | 8/1989 | McPherson |
| 4,860,430 A | 8/1989 | Raschbichler et al. |
| 4,864,266 A | 9/1989 | Feather et al. |
| 4,883,230 A | 11/1989 | Lindstrom |
| 4,890,040 A | 12/1989 | Gundersen |
| 4,894,284 A | 1/1990 | Yamanouchi et al. |
| 4,914,386 A | 4/1990 | Zocholl |
| 4,918,347 A | 4/1990 | Takaba |
| 4,918,835 A | 4/1990 | Wcislo et al. |
| 4,924,342 A | 5/1990 | Lee |
| 4,926,079 A | 5/1990 | Niemela et al. |
| 4,942,326 A | 7/1990 | Butler, III et al. |
| 4,949,001 A | 8/1990 | Campbell |
| 4,982,147 A * | 1/1991 | Lauw ................ 318/729 |
| 4,994,952 A | 2/1991 | Silva et al. |
| 4,997,995 A | 3/1991 | Simmons et al. |
| 5,012,125 A | 4/1991 | Conway |
| 5,030,813 A | 7/1991 | Stanisz |
| 5,036,165 A | 7/1991 | Elton et al. |
| 5,036,238 A | 7/1991 | Tajima |
| 5,066,881 A | 11/1991 | Elton et al. |
| 5,067,046 A | 11/1991 | Elton et al. |
| 5,083,360 A | 1/1992 | Valencic et al. |
| 5,086,246 A | 2/1992 | Dymond et al. |
| 5,091,609 A | 2/1992 | Swada et al. |
| 5,094,703 A * | 3/1992 | Takaoka et al. ............ 148/269 |
| 5,095,175 A | 3/1992 | Yoshida et al. |
| 5,097,241 A | 3/1992 | Smith et al. |
| 5,097,591 A | 3/1992 | Wcislo et al. |
| 5,111,095 A | 5/1992 | Hendershot |
| 5,124,607 A | 6/1992 | Rieber et al. |
| 5,136,459 A | 8/1992 | Fararooy |
| 5,140,290 A | 8/1992 | Dersch |
| 5,153,460 A | 10/1992 | Bovino et al. |
| 5,168,662 A | 12/1992 | Nakamura et al. |
| 5,171,941 A | 12/1992 | Shimizu et al. |
| 5,182,537 A | 1/1993 | Thuis |
| 5,187,428 A | 2/1993 | Hutchison et al. |
| 5,231,249 A | 7/1993 | Kimura et al. |
| 5,235,488 A | 8/1993 | Koch |

| | | | | | |
|---|---|---|---|---|---|
| 5,246,783 A | 9/1993 | Spenadel et al. | DE | 586121 | 10/1933 |
| 5,264,778 A | 11/1993 | Kimmel et al. | DE | 604972 | 11/1934 |
| 5,287,262 A | 2/1994 | Klein | DE | 629301 | 4/1936 |
| 5,304,883 A | 4/1994 | Denk | DE | 673545 | 3/1939 |
| 5,305,961 A | 4/1994 | Errard et al. | DE | 719009 | 3/1942 |
| 5,321,308 A | 6/1994 | Johncock | DE | 846583 | 8/1952 |
| 5,323,330 A | 6/1994 | Asplund et al. | DE | 875227 | 4/1953 |
| 5,325,008 A | 6/1994 | Grant | DE | 975999 | 1/1963 |
| 5,325,259 A | 6/1994 | Paulsson | DE | 1465719 | 5/1969 |
| 5,327,637 A | 7/1994 | Britenbach et al. | DE | 1807391 | 5/1970 |
| 5,341,281 A | 8/1994 | Skibinski | DE | 2050674 | 5/1971 |
| 5,343,139 A | 8/1994 | Gyugyi et al. | DE | 1638176 | 6/1971 |
| 5,355,046 A | 10/1994 | Weigelt | DE | 2155371 | 5/1973 |
| 5,365,132 A | 11/1994 | Hann et al. | DE | 2400698 | 7/1975 |
| 5,387,890 A | 2/1995 | Estop et al. | DE | 2520511 | 11/1976 |
| 5,397,513 A | 3/1995 | Steketee, Jr. | DE | 2656389 | 6/1978 |
| 5,399,941 A | 3/1995 | Grothaus et al. | DE | 2721905 | 11/1978 |
| 5,400,005 A | 3/1995 | Bobry | DE | 137164 | 8/1979 |
| 5,408,169 A | 4/1995 | Jeanneret | DE | 138840 | 11/1979 |
| 5,449,861 A | 9/1995 | Fujino et al. | DE | 2824951 | 12/1979 |
| 5,452,170 A | 9/1995 | Ohde et al. | DE | 2835386 | 2/1980 |
| 5,468,916 A | 11/1995 | Litenas et al. | DE | 2839517 | 3/1980 |
| 5,499,178 A | 3/1996 | Mohan | DE | 2854520 | 6/1980 |
| 5,500,632 A | 3/1996 | Halser, III | DE | 3009102 | 9/1980 |
| 5,510,942 A | 4/1996 | Bock et al. | DE | 2913697 | 10/1980 |
| 5,530,307 A | 6/1996 | Horst | DE | 2920478 | 12/1980 |
| 5,533,658 A | 7/1996 | Benedict et al. | DE | 3028777 | 3/1981 |
| 5,534,754 A | 7/1996 | Poumey | DE | 2939004 | 4/1981 |
| 5,545,853 A | 8/1996 | Hildreth | DE | 3006382 | 8/1981 |
| 5,550,410 A | 8/1996 | Titus | DE | 3008818 | 9/1981 |
| 5,583,387 A | 12/1996 | Takeuchi et al. | DE | 209313 | 4/1984 |
| 5,587,126 A | 12/1996 | Steketee, Jr. | DE | 3305225 | 8/1984 |
| 5,598,137 A | 1/1997 | Alber et al. | DE | 3309051 | 9/1984 |
| 5,607,320 A | 3/1997 | Wright | DE | 3441311 | 5/1986 |
| 5,612,510 A | 3/1997 | Hildreth | DE | 3543106 | 6/1987 |
| 5,654,602 A * | 8/1997 | Willyoung ........ 310/179 | DE | 2917717 | 8/1987 |
| 5,663,605 A | 9/1997 | Evans et al. | DE | 3612112 | 10/1987 |
| 5,689,223 A | 11/1997 | Demarmels et al. | DE | 3726346 | 2/1989 |
| 5,807,447 A | 9/1998 | Forrest | DE | 3925337 | 2/1991 |
| 5,834,699 A | 11/1998 | Buck et al. | DE | 4023903 | 11/1991 |
| 6,572,926 B1 | 6/2003 | Morgan et al. | DE | 4022476 | 1/1992 |
| | | | DE | 4233558 | 3/1994 |
| | FOREIGN PATENT DOCUMENTS | | DE | 4402184 | 8/1995 |
| CH | SU 266037 | 10/1965 | DE | 4409794 | 8/1995 |
| CH | 534448 | 2/1973 | DE | 4412761 | 10/1995 |
| CH | 539328 | 7/1973 | DE | 4420322 | 12/1995 |
| CH | SU 646403 | 2/1979 | DE | 19620906 | 1/1996 |
| CH | 657482 | 8/1986 | DE | 4438186 | 5/1996 |
| CH | SU 1189322 | 10/1986 | DE | 19020222 | 3/1997 |
| DE | 40414 | 8/1887 | DE | 19547229 | 6/1997 |
| DE | 277012 | 7/1914 | DE | 468827 | 7/1997 |
| DE | 336418 | 6/1920 | DE | 134022 | 12/2001 |
| DE | 372390 | 3/1923 | EP | 049104 | 4/1982 |
| DE | 386561 | 12/1923 | EP | 0493704 | 4/1982 |
| DE | 387973 | 1/1924 | EP | 0056580 A1 | 7/1982 |
| DE | 406371 | 11/1924 | EP | 078908 | 5/1983 |
| DE | 425551 | 2/1926 | EP | 0102513 | 3/1984 |
| DE | 426793 | 3/1926 | EP | 0120154 | 10/1984 |
| DE | 432169 | 7/1926 | EP | 0130124 | 1/1985 |
| DE | 433749 | 9/1926 | EP | 0142813 | 5/1985 |
| DE | 435608 | 10/1926 | EP | 0155405 | 9/1985 |
| DE | 435609 | 10/1926 | EP | 0102513 | 1/1986 |
| DE | 441717 | 3/1927 | EP | 0174783 | 3/1986 |
| DE | 443011 | 4/1927 | EP | 0185788 | 7/1986 |
| DE | 460124 | 5/1928 | EP | 0277358 | 8/1986 |
| DE | 482506 | 9/1929 | EP | 0234521 | 9/1987 |
| DE | 501181 | 7/1930 | EP | 0244069 | 11/1987 |
| DE | 523047 | 4/1931 | EP | 0246377 | 11/1987 |
| DE | 568508 | 1/1933 | EP | 0265868 | 5/1988 |
| DE | 572030 | 3/1933 | EP | 0274691 | 7/1988 |
| DE | 584639 | 9/1933 | EP | 0280759 | 9/1988 |

| | | | | | |
|---|---|---|---|---|---|
| EP | 0282876 | 9/1988 | GB | 870583 | 6/1961 |
| EP | 0309096 | 3/1989 | GB | 913386 | 12/1962 |
| EP | 0314860 | 5/1989 | GB | 965741 | 8/1964 |
| EP | 0316911 | 5/1989 | GB | 992249 | 5/1965 |
| EP | 0317248 | 5/1989 | GB | 1024583 | 3/1966 |
| EP | 0335430 | 10/1989 | GB | 1053337 | 12/1966 |
| EP | 0342554 | 11/1989 | GB | 1059123 | 2/1967 |
| EP | 0221404 | 5/1990 | GB | 1103098 | 2/1968 |
| EP | 0375101 | 6/1990 | GB | 1103099 | 2/1968 |
| EP | 0406437 | 1/1991 | GB | 1117401 | 6/1968 |
| EP | 0439410 | 7/1991 | GB | 1135242 | 12/1968 |
| EP | 0440865 | 8/1991 | GB | 1147049 | 4/1969 |
| EP | 0469155 A1 | 2/1992 | GB | 1157885 | 7/1969 |
| EP | 0490705 | 6/1992 | GB | 1174659 | 12/1969 |
| EP | 0503817 | 9/1992 | GB | 1236082 | 6/1971 |
| EP | 0571155 | 11/1993 | GB | 1268770 | 3/1972 |
| EP | 0620570 | 10/1994 | GB | 1319257 | 6/1973 |
| EP | 0620630 | 10/1994 | GB | 1322433 | 7/1973 |
| EP | 0642027 | 3/1995 | GB | 1340983 | 12/1973 |
| EP | 0671632 | 9/1995 | GB | 1341050 | 12/1973 |
| EP | 0676777 | 10/1995 | GB | 1365191 | 8/1974 |
| EP | 0677915 | 10/1995 | GB | 1395152 | 5/1975 |
| EP | 0684679 | 11/1995 | GB | 1424982 | 2/1976 |
| EP | 0684682 | 11/1995 | GB | 1426594 | 3/1976 |
| EP | 0695019 | 1/1996 | GB | 1438610 | 6/1976 |
| EP | 0732787 | 9/1996 | GB | 1445284 | 8/1976 |
| EP | 0738034 | 10/1996 | GB | 1479904 | 7/1977 |
| EP | 0739087 A2 | 10/1996 | GB | 1493163 | 11/1977 |
| EP | 0740315 | 10/1996 | GB | 1502938 | 3/1978 |
| EP | 0749190 A2 | 12/1996 | GB | 1525745 | 9/1978 |
| EP | 0751605 | 1/1997 | GB | 2000625 | 1/1979 |
| EP | 0739087 A3 | 3/1997 | GB | 1548633 | 7/1979 |
| EP | 0749193 A3 | 3/1997 | GB | 2046142 | 11/1979 |
| EP | 0780926 | 6/1997 | GB | 2022327 | 12/1979 |
| EP | 0802542 | 10/1997 | GB | 2025150 | 1/1980 |
| EP | 0913912 A1 | 5/1999 | GB | 2034101 | 5/1980 |
| FR | 805544 | 4/1936 | GB | 1574796 | 9/1980 |
| FR | 841351 | 1/1938 | GB | 2070341 | 9/1981 |
| FR | 847899 | 12/1938 | GB | 2070470 | 9/1981 |
| FR | 916959 | 12/1946 | GB | 2071433 | 9/1981 |
| FR | 1011924 | 4/1949 | GB | 2081523 | 2/1982 |
| FR | 1126975 | 3/1955 | GB | 2099635 | 12/1982 |
| FR | 1238795 | 7/1959 | GB | 2105925 | 3/1983 |
| FR | 2108171 | 5/1972 | GB | 2106306 | 4/1983 |
| FR | 2251938 | 6/1975 | GB | 2106721 | 4/1983 |
| FR | 2305879 | 10/1976 | GB | 2136214 | 9/1984 |
| FR | 2376542 | 7/1978 | GB | 2140195 | 11/1984 |
| FR | 2467502 | 4/1981 | GB | 2150153 | 6/1985 |
| FR | 2481531 | 10/1981 | GB | 2268337 | 1/1994 |
| FR | 2556146 | 6/1985 | GB | 2273819 | 6/1994 |
| FR | 2594271 | 8/1987 | GB | 2283133 | 4/1995 |
| FR | 2708157 | 1/1995 | GB | 2289992 | 12/1995 |
| GB | 123906 | 3/1919 | GB | 2308490 | 6/1997 |
| GB | 268271 | 3/1927 | GB | 2332557 | 6/1999 |
| GB | 293861 | 11/1928 | HU | 175494 | 11/1981 |
| GB | 292999 | 4/1929 | JP | 60206121 | 3/1959 |
| GB | 319313 | 7/1929 | JP | 57043529 | 8/1980 |
| GB | 518993 | 3/1940 | JP | 57126117 | 5/1982 |
| GB | 537609 | 6/1941 | JP | 59076156 | 10/1982 |
| GB | 540456 | 10/1941 | JP | 59159642 | 2/1983 |
| GB | 589071 | 6/1947 | JP | 6264964 | 9/1985 |
| GB | 666883 | 2/1952 | JP | 1129737 | 5/1989 |
| GB | 685416 | 1/1953 | JP | 62320631 | 6/1989 |
| GB | 702892 | 1/1954 | JP | 2017474 | 1/1990 |
| GB | 715226 | 9/1954 | JP | 3245748 | 2/1990 |
| GB | 723457 | 2/1955 | JP | 4179107 | 11/1990 |
| GB | 739962 | 11/1955 | JP | 318253 | 1/1991 |
| GB | 763761 | 12/1956 | JP | 424909 | 1/1992 |
| GB | 805721 | 12/1958 | JP | 5290947 | 4/1992 |
| GB | 827600 | 2/1960 | JP | 6196343 | 12/1992 |
| GB | 854728 | 11/1960 | JP | 6233442 | 2/1993 |

| | | | | | | |
|---|---|---|---|---|---|---|
| JP | 6325629 | 5/1993 | | WO | WO9745928 | 12/1997 |
| JP | 7057951 | 8/1993 | | WO | WO9745929 | 12/1997 |
| JP | 7264789 | 3/1994 | | WO | WO9745930 | 12/1997 |
| JP | 8167332 | 12/1994 | | WO | WO9745931 | 12/1997 |
| JP | 7161270 | 6/1995 | | WO | WO9745932 | 12/1997 |
| JP | 8264039 | 11/1995 | | WO | WO9745933 | 12/1997 |
| JP | 9200989 | 1/1996 | | WO | WO9745934 | 12/1997 |
| JP | 8036952 | 2/1996 | | WO | WO9745935 | 12/1997 |
| JP | 8167360 | 6/1996 | | WO | WO9745936 | 12/1997 |
| LU | 67199 | 3/1972 | | WO | WO9745937 | 12/1997 |
| SE | 90308 | 9/1937 | | WO | WO9745938 | 12/1997 |
| SE | 305899 | 11/1968 | | WO | WO9745939 | 12/1997 |
| SE | 255156 | 2/1969 | | WO | WO9747067 | 12/1997 |
| SE | 342428 | 12/1971 | | WO | WO9820595 | 5/1998 |
| SE | 453236 | 1/1982 | | WO | WO9820596 | 5/1998 |
| SE | 457792 | 6/1987 | | WO | WO9820597 | 5/1998 |
| SE | 502417 | 12/1993 | | WO | WO 98/20598 | 5/1998 |
| SU | 792302 | 1/1971 | | WO | WO9820600 | 5/1998 |
| SU | 425268 | 9/1974 | | WO | WO 98/20602 | 5/1998 |
| SU | 1019553 | 1/1980 | | WO | WO9821385 | 5/1998 |
| SU | 694939 | 1/1982 | | WO | PCT/FR 98/00468 | 6/1998 |
| SU | 955369 | 8/1983 | | WO | WO9827634 | 6/1998 |
| SU | 1511810 | 5/1987 | | WO | WO9827635 | 6/1998 |
| WO | WO8202617 | 8/1982 | | WO | WO9827636 | 6/1998 |
| WO | WO8502302 | 5/1985 | | WO | WO9829927 | 7/1998 |
| WO | WO9011389 | 10/1990 | | WO | WO9829928 | 7/1998 |
| WO | WO9012409 | 10/1990 | | WO | WO9829929 | 7/1998 |
| WO | PCT/DE 90/00279 | 11/1990 | | WO | WO9829930 | 7/1998 |
| WO | WO9101059 | 1/1991 | | WO | WO9829931 | 7/1998 |
| WO | WO9101585 | 2/1991 | | WO | WO9829932 | 7/1998 |
| WO | WO9107807 | 3/1991 | | WO | WO9833731 | 8/1998 |
| WO | PCT SE 91/00077 | 4/1991 | | WO | WO9833736 | 8/1998 |
| WO | WO9109442 | 6/1991 | | WO | WO9833737 | 8/1998 |
| WO | WO 91/11841 | 8/1991 | | WO | WO9834238 | 8/1998 |
| WO | WO8115862 | 10/1991 | | WO | WO 98/34239 | 8/1998 |
| WO | WO 91/15755 | 10/1991 | | WO | WO9834240 | 8/1998 |
| WO | WO9201328 | 1/1992 | | WO | WO9834241 | 8/1998 |
| WO | WO9203870 | 3/1992 | | WO | WO9834242 | 8/1998 |
| WO | WO9321681 | 10/1993 | | WO | WO9834243 | 8/1998 |
| WO | WO9406194 | 3/1994 | | WO | WO9834244 | 8/1998 |
| WO | WO9518058 | 7/1995 | | WO | WO9834245 | 8/1998 |
| WO | WO9522153 | 8/1995 | | WO | WO9834246 | 8/1998 |
| WO | WO9524049 | 9/1995 | | WO | WO9834247 | 8/1998 |
| WO | WO9622606 | 7/1996 | | WO | WO9834248 | 8/1998 |
| WO | WO9622607 | 7/1996 | | WO | WO9834249 | 8/1998 |
| WO | PCT/CN 96/00010 | 10/1996 | | WO | WO9834250 | 8/1998 |
| WO | WO9630144 | 10/1996 | | WO | WO9834309 | 8/1998 |
| WO | WO9710640 | 3/1997 | | WO | WO9834312 | 8/1998 |
| WO | WO9711831 | 4/1997 | | WO | WO9834315 | 8/1998 |
| WO | WO9716881 | 5/1997 | | WO | WO9834321 | 8/1998 |
| WO | WO 97/29494 | 8/1997 | | WO | WO9834322 | 8/1998 |
| WO | WO45908 | 12/1997 | | WO | WO9834323 | 8/1998 |
| WO | WO9745288 | 12/1997 | | WO | WO9834326 | 8/1998 |
| WO | WO9745847 | 12/1997 | | WO | WO9834327 | 8/1998 |
| WO | WO9745848 | 12/1997 | | WO | WO9834328 | 8/1998 |
| WO | WO9745906 | 12/1997 | | WO | WO9834329 | 8/1998 |
| WO | WO9745907 | 12/1997 | | WO | WO9834330 | 8/1998 |
| WO | WO9745912 | 12/1997 | | WO | WO9834331 | 8/1998 |
| WO | WO9745914 | 12/1997 | | WO | W99834325 | 8/1998 |
| WO | WO9745915 | 12/1997 | | WO | WO 98/40627 | 9/1998 |
| WO | WO9745916 | 12/1997 | | WO | WO 98/43336 | 10/1998 |
| WO | WO9745918 | 12/1997 | | WO | WO9917309 | 4/1999 |
| WO | WO9745919 | 12/1997 | | WO | WO9917311 | 4/1999 |
| WO | WO9745920 | 12/1997 | | WO | WO9917312 | 4/1999 |
| WO | WO9745921 | 12/1997 | | WO | WO9917313 | 4/1999 |
| WO | WO9745922 | 12/1997 | | WO | WO9917314 | 4/1999 |
| WO | WO9745923 | 12/1997 | | WO | WO9917315 | 4/1999 |
| WO | WO9745924 | 12/1997 | | WO | WO9917316 | 4/1999 |
| WO | WO9745925 | 12/1997 | | WO | WO9917422 | 4/1999 |
| WO | WO9745926 | 12/1997 | | WO | WO9917424 | 4/1999 |
| WO | WO9745927 | 12/1997 | | WO | WO9917425 | 4/1999 |

| | | |
|---|---|---|
| WO | WO9917426 | 4/1999 |
| WO | WO9917427 | 4/1999 |
| WO | WO9917428 | 4/1999 |
| WO | WO9917429 | 4/1999 |
| WO | WO9917432 | 4/1999 |
| WO | WO9917433 | 4/1999 |
| WO | WO9919963 | 4/1999 |
| WO | WO9919969 | 4/1999 |
| WO | WO9919970 | 4/1999 |
| WO | PCT/SE 98/02148 | 6/1999 |
| WO | WO9927546 | 6/1999 |
| WO | WO9928919 | 6/1999 |
| WO | WO9928921 | 6/1999 |
| WO | WO 99/28922 | 6/1999 |
| WO | WO9928923 | 6/1999 |
| WO | WO9928924 | 6/1999 |
| WO | WO9928925 | 6/1999 |
| WO | WO9928926 | 6/1999 |
| WO | WO9928927 | 6/1999 |
| WO | WO9928928 | 6/1999 |
| WO | WO9928929 | 6/1999 |
| WO | WO9928930 | 6/1999 |
| WO | WO9928931 | 6/1999 |
| WO | WO9928934 | 6/1999 |
| WO | WO9928994 | 6/1999 |
| WO | WO9929005 | 6/1999 |
| WO | WO 99/29005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO 99/29023 | 6/1999 |
| WO | WO9929024 | 6/1999 |
| WO | WO 99/29025 | 6/1999 |
| WO | WO9929026 | 6/1999 |
| WO | WO9929029 | 6/1999 |
| WO | WO9929034 | 6/1999 |

OTHER PUBLICATIONS

Ohne Tranformator direkt ins Netz; Owman et al. ABB. AB; Feb. 8, 1999; pp48–51.

Submersible Motors and Wet–Rotor Motors for Centrifugal Pumps Submerged in the Fluid Handled; K.. Bienick, KSB; pp9–17.

High Voltage Generators; G. Beschastnov et al; 1977; vol. 48. No. 6 pp1–7.

Eine neue Type von Unterwassermotoren; Electrotechnik und Maschinenbam, 49: Aug. 1931; pp2–3.

Problems in design of the 110–5OokV high–voltage generators; Nikiti et al; World Electrotechnical Congress; Jun. 21–27, 1977; Section 1. Paper #18.

Manufacture and Testing of Roebel bars; P. Marti et al; 1960, Pub.86, vol. 8, pp 25–31.

Hydroalternators of 110 to 220 kV Elektrotechn. Obz., vol. 64, No. 3, pp132–136 Mar. 1975; A. Abramov.

Design Concepts for an Amorphous Metal Distribution Transformer; E. Boyd et al; IEEE Nov. 1984.

Neue Wege zum Bau zweipoliger Turbogeneratoren bis 2 GVA, 6OkV Elektrotechnik und Maschinenbau Wien Janner 1972. Heft 1, Seite 1–11; G. Aichholzer.

Optimizing designs of water–resistant magnet wire; V. Kuzenev et al; Elektrotekhnika. vol. 59, No. 12, pp35–40, 1988.

Zur Entwicklung der Tauchpumpenmotoren; A. Schanz; KSB. pp19–24.

Direct Generation of alternating current at high voltages; R. Parsons; Apr. 1929 IEEE Journal, vol. 67 #393, pp1065–1080.

Stopfbachslose Umwalzpumpen– ein wichtiges Element im modernen Kraftwerkbau: H. Holz. KSB 1, pp13–19, 1960.

Zur Geschichte der Brown Boveri–Synchron–Maschinen; Vierzig Jahre Generatorbau: Jan.–Feb. 1931 pp15–39.

Technik und Anwendung Moderner Tauchpumpen; A. Heumann.

High capacity synchronous generator having no tooth stator; V.S. Kildishev et al; No. 1, 1977 pp11–16.

Der Asynchronmotor als Antrieb stopfbcichsloser Pumpen; E. Picmaus; Eletrotechnik und Maschinenbay No. 78, pp153–155. 1961.

Low core loss rotating flux transformer; R. F. Krause, et al; American Institute Physics J.Appl.Phys vol. 64 #10 Nov. 1988, pp5376–5378.

An EHV bulk Power transmission line Made with Low Loss XLPE Cable; Ichihara et al.

Underground Transmission Systems Reference Book.

Power System Stability and Control; P. Kundur.

Six phase Synchronous Machine with AC and DC Stator Connections. Part II:Harmonic Studies and a proposed Uninterruptible Power Supply Scheme; R. Schiferl et al.

Six phase Synchronous Machine with AC and DC Stator Connections, Part 1: Equivalent circuit representation and Steady–State Analysis: R. Schiferl et al.

Reactive Power Compensation; T. Petersson.

Different Types of Permanent Magnet Rotors.

Permanent Magnet Machines; K. Binns.

Hochspannungsaniagen for Wechselstrom; 97. Hochspannungsaufgaben an Generatoren und Motoren: Roth et al; pp452–455.

Hochspannungsanlagen for Wechselstrom; 97. Hochspannungsaufgaben an Generatoren und Motoren; Roth et al; Spring 1959, pp30–33.

Neue Lbsungswege zum Entwurf grosser Turbogeneratoren bis 2GVA, 6OkV; G. Aicholzer: Sep. 1974, pp249–255.

Advanced Turbine–generators– an assessment; A. Appleton, et al; International Conf. Proceedings, Lg HV Elec. Sys. Paris, FR, Aug.–Sep./1976, vol. I, Section 11–02, p. 1–9.

Fully slotless turbogenerators; E. Spooner; Proc., IEEE vol. 120 #12, Dec. 1973.

Toroidal winding geometry for high voltage superconducting alternators; J. Kirtley et al; MIT—Elec. Power Sys. Engrg. Lab for IEEE PES Feb. 1974.

High–Voltage Stator Winding Development; D. Albright et al; Proj. Report EL339, Project 1716. Apr. 1984.

Powerformer ™: A giant step in power plant engineering; Owman et al; CIGRE 1998, Paper 11:1.1.

Thin Type DC/DC Converter using a coreless wire transformer; K. Onda et al; Proc. IEEE Power Electronics Spec. Conf. Jun. 1994, pp330–334.

Development of extruded polymer insulated superconducting cable.

Transformer core losses; B. Richardson; Proc. IEEE May 1986, pp365–368.

Cloth–transformer with divided windings and tension annealed amorphous wire; T. Yammamoto et al; IEEE Translation Journal on Magnetics in Japan vol. 4, No. 9 Sep. 1989.

A study of equipment sizes and constraints for a unified power flow controller; J Bian et al; IEEE 1996.

A test installation of a self–tuned ac filter in the Konti–Skan 2 HVDC link; T. Holmgren,G. Asplund, S. Valdemarsson, P. Hidman of ABB; U. Jonsson of Svenska Kraftnat; O. loof of Vattenfall Vastsverige AB; IEEE Stockholm Power Tech Conference Jun. 1995, pp 64–70.

Analysis of faulted power Systems; P Anderson, Iowa State University Press / Ames, Iowa, 1973, pp 255–257.

36–Kv. Generators Arise from Insulation Research; P. Sidler; *Electrical World* Oct. 15, 1932, ppp 524.

Oil Water cooled 300 MW turbine generator;L.P. Gnedin et al; *Elektrotechnika* , 1970, pp 6–8.

J&P Transformer Book 11$^{th}$ Edition;A. C. Franklin et al; owned by Butterworth–Heinemann Ltd, Oxford Printed by Hartnolls Ltd in Great Britain 1983, pp29–67.

Transformerboard; H.P. Moser et al; 1979, pp 1–19.

The Skagerrak transmission—the world's longest HVDC submarine cable link; L. Haglof et al of ASEA; ASEA Journal vol. 53, No. 1–2, 1980, pp 3–12.

Direct Connection of Generators of HVDC Converters: Main Characteristics and Comparative Advantages; J.Arrillaga et al; *Electra* No. 149, Aug. 1993, pp 19–37.

Our flexible friend article; M. Judge; *New Scientist,* May 10, 1997, pp 44–48.

In–Service Performance of HVDC Converter transformers and oil–cooled smoothig reactors; G.L. Desilets et al; *Electra* No. 155, Aug. 1994, pp 7–29.

Transformateurs a courant continu haute tension–examen des specifications; A. Lindroth et al; *Electra* No. 141, Apr. 1992, pp 34–39.

Development of a Termination for the 77 kV–Class High Tc Superconducting Power Cable; T. Shimonosono et al; IEEE Power Delivery, vol. 12, No. 1, Jan. 1997, pp 33–38.

Verification of Limiter Performance in Modern Excitation Control Systems; G. K. Girgis et al; IEEE Energy Conservation, vol. 10, No. 3, Sep. 1995, pp 538–542.

A High Initial response Brushless Excitation System; T. L. Dillman et al; IEEE Power Generation Winter Meeting Proceedings, Jan. 31, 1971, pp 2089–2094.

Design, manufacturing and cold test of a superconducting coil and its cryostat for SMES applications; A. Bautista et al; IEEE Applied Superconductivity, vol. 7, No. 2, Jun. 1997, pp 853–856.

Quench Protection and Stagnant Normal Zones in a Large Cryostable SMES; Y. Lvovsky et al; IEEE Applied Superconductivity, vol. 7, No. 2, Jun. 1997, pp 857–860.

Design and Construction of the 4 Tesla Background Coil for the Navy SMES Cable Test Apparatus; D. W.Scherbarth et al; IEEE Appliel Superconductivity, vol. 7, No. 2, Jun. 1997, pp 840–843.

High Speed Synchronous Motors Adjustable Speed Drives; ASEA Generation Pamphlet OG 135–101 E, Jan. 1985, pp 1–4.

Billig burk motar overtonen; A. Felldin; *ERA* (TEKNIK) Aug. 1994, pp 26–28.

400–kV XLPE cable system passes CIGRE test; ABB Article; ABB Review Sep. 1995, pp 38.

FREQSYN—a new drive system for high power applications;J–A. Bergman et al; ASEA Journal 59, Apr. 1986, pp 16–19.

Canadians Create Conductive Concrete; J. Beaudoin et al; *Science,* vol. 276, May 23, 1997, pp 1201.

Fully Water–Cooled 190 MVA Generators in the Tonstad Hydroelectric Power Station; E. Ostby et al; BBC Review Aug. 1969, pp 380–385.

Relocatable static var compensators help control unbundled power flows; R. C. Knight et al; *Transmission & Distribution,* Dec. 1996, pp 49–54.

Investigation and Use of Asynchronized Machines in Power Systems*; N.I.Blotskii et al; *Elektrichestvo,* No. 12, 1–6, 1985, pp 90–99.

Variable–speed switched reluctance motors; P.J. Lawrenson et al; IEE proc, vol. 127, Pt.B, No. 4, Jul. 1980, pp 253–265.

Das Einphasenwechselstromsystem hoherer Frequenz; J.G. Heft; Elektrische Bahnen eb; Dec. 1987, pp 388–389.

Power Transmission by Direct Current;E. Uhlmann;ISBN 3–540–07122–9 Springer–Verlag, Berlin/Heidelberg/New York; 1975, pp 327–328.

Elektriska Maskiner; F. Gustavson; Institute for Elkreafteknilk, KTH; Stockholm, 1996, pp 3–6–3–12.

Die Wechselstromtechnik; A. Cour' Springer Verlag, Germany; 1936, pp 586–598.

Insulation systems for superconducting transmission cables; O. Toennesen; Nordic Insulation Symposium, Bergen, 1996, pp 425–432.

MPTC: An economical alternative to universal power flow controllers;N. Mohan; EPE 1997, Trondheim, pp 3. 1027–3, 1030.

Lexikon der Technik; Luger; Band 2, Grundlagen der Elektrotechnik und Kerntechnik, 1960, pp 395.

Das Handbuch der Lokomotiven (hungarian locomotive V40 1'D'); B. Holligsworth et al; Pawlak Verlagsgesellschaft; 1933, pp. 254–255.

Synchronous machines with single or double 3–phase star–connected winding fed by 12–pulse load commutated inverter. Simulation of operational behaviour; C. Invarson et al; ICEM 1994, International Conference on electrical machines, vol. 1, pp 267–272.

Elkrafthandboken, Elmaskiner; A. Rejminger; Elkrafthandboken, Elmaskiner 1996, 15–20.

Power Electronics—in Theory and Practice; K. Thorborg; ISBN 0–86238–341–2, 1993, pp 1–13.

Regulating transformers in power systems– new concepts and applications; E. Wirth et al; ABB Review Apr. 1997, p 12–20.

Tranforming transformers; S. Mehta et al; *IEEE Spectrum,* Jul. 1997, pp. 43–49.

A study of equipment sizes and constraints for a unified power flow controller; J. Bian et al; IEEE Transactions on Power Delivery, vol. 12, No. 3, Jul. 1997, pp. 1385–1391.

Industrial High Voltage; F.H. Kreuger; *Industrial High Voltage* 1991 vol. I, pp. 113–117.

Hochspannungstechnik; A. Küchler; Hochspannungstechnik, VDI Verlag 1996, pp. 365–366, ISBN 3–18–401530–0 or 3–540–62070–2.

High Voltage Engineering; N.S. Naidu; High Voltage Engineering ,second edition 1995 ISBN 0–07–462286–2, Chapter 5, pp91–98.

Performance Characteristics of a Wide Range Induction Type Frequency Converter; G.A. Ghoneem; Ieema Journal, Sep. 1995, pp 21–34.

International Electrotechnical Vocabulary, Chapter 551 Power Electronics;unknown author; International Electrotechnical Vocabulary Chapter 551: Power Electronics Bureau Central de la Commission Electrotechnique Internationale, Geneve; 1982, pp1–65.

Design and manufacture of a large superconducting homopolar motor; A.D. Appleton; IEEE Transactions on Magnetics, vol. 19,No. 3, Part 2, May 1983, pp 1048–1050.

Application of high temperature superconductivy to electric motor design; J.S. Edmonds et al; IEEE Transactions on Energy Conversion Jun. 1992, No. 2 , pp 322–329.

Power Electronics and Variable Frequency Drives; B. Bimal; IEEE industrial Electronics—Technology and Applications, 1996, pp. 356.

Properties of High Plymer Cement Mortar; M. Tamai et al; *Science & Technology in Japan,* No. 63 ; 1977, pp 6–14.

Weatherability of Polymer–Modified Mortars after Ten–Year Outdoor Exposure in Koriyama and Sapporo; Y. Ohama et al; *Science & Technology in Japan* No. 63; 1977, pp 26–31.

SMC Powders Open New Magnetic Applications; M. Persson (Editor); *SMC Update* ,vol. 1, No. 1, Apr. 1997.

Characteristics of a laser triggered spark gap using air, AR, CH4, H2, He, N2, SF6 and Xe; W.D. Kimura et al; Journal of Applied Physics, vol. 63, No. 6, Mar. 15, 1988, p. 1882–1888.

Low–intensy laser–triggering of rail–gaps with magnesium–aerosol switching–gases; W. Frey; 11th International Pulse Power Conference, 1997, Baltimore, USA Digest of Technical Papers, p. 322–327.

P. Marti and R. Schuler, "Manufacturing and Testing of Roebel Bars".

M. Ichihara and F. Fukasawa, "An EHV Bulk Power Transmission Line Made with Low Loss XLPE Cable," Aug. 1992, *Hitachi Cable Review,* No. 11, pp. 3–6.

*Underground Transmission Systems Reference Book,* 1992 Edition, prepared by Power Technologies, Inc. for Electric Power Research Institute (title page).

P. Kundur, "Power System Stability and Control," *Electric Power Research Institute Power System Engineering Series,* McGraw–Hill, Inc.

R. F. Schiferl and C. M. Ong, "Six Phase Synchronous Machine with AC and DC Stator Connections, Part II; Harmonic Studies and a Proposed Uninterruptible Power Supply Scheme", *IEEE Transactions on Power Apparatus and Systems,* vol. PAS–102, No. 8, Aug. 1983, pp. 2694–2701.

R. F. Schiferl and C. M. Ong, "Six Phase Synchronous Machine with AC and DC Stator Connections, Part I: Equivalent Circuit Representation and Steady–State Analysis", *IEEE Transactions on Power Apparatus and Systems,* vol. PAS–102, No. 8, Aug. 1983, pp. 2685–2693.

T. Petersson, *Reactive Power Compensation,* Abb Power Systems AB, Dec. 1993.

"Different types of Permanent Magnet Rotors", a summary by ABB Corporate Research, Nov. 1997.

K. Binns, Permanent Magnet Machines, *Handbook of Electric Machines,* Chapter 9, McGraw Hill, 1987, pp. 9–1–9–25.

* cited by examiner

TURBO GENERATOR PLANT WITH A HIGH VOLTAGE ELECTRIC GENERATOR

TECHNICAL FIELD

The present invention relates to equipment, primarily in thermal power plants, for generating active and reactive electric power for high-voltage distribution or transmission networks connected to it. More specifically the invention relates to rotating electromechanical equipment for generating electric power for high-voltage distribution or transmission networks without intermediate transformers. The generator or generators included in the equipment have a magnetic circuit, normally comprising a core of iron and an air gap, a cooling system and at least one, usually two, windings disposed in the stator and rotor, respectively.

BACKGROUND ART

Thermal power plants are nowadays built in accordance with a number different principles. Various types of fuel, e.g. natural gas, oil, bio-fuel, coal, mixtures of the fuels just mentioned, or nuclear fuel, are used in order to achieve high temperature in a gas in either a combustion process or a nuclear process. This gas may be either waste gases from the combustion or indirectly heated steam. The heating is performed in a relatively small volume, which means that the pressure is extremely high. The hot gas is then conveyed in gradually larger and larger volumes, the thermal energy then being converted to kinetic energy. The fast-moving gas is allowed in a number of steps to influence the vanes in a turbine, thereby giving rise to a turning phase. At least one generator mounted on the same shaft as the turbine, or via a gear, converts the energy to electric power which, via a step-up transformer, is emitted to distribution or transmission networks, hereinafter also termed power networks.

Power plants consisting of only one unit in accordance with one of the principles explained above can naturally be the best solution in certain cases. However, a plant is often advantageously built up of more units. This offers greater flexibility and robustness against interference in the equipment, various units may also be designed for operation with different types of fuel so that the fuel that is currently cheapest can be used. Other combinations are possible to increase the total efficiency of the plant, where residual heat from one unit can be utilized by another.

A distinction is normally made between two types of turbines: gas turbines and steam turbines. Gas turbines are operated directly by combustion gases (possibly after cleaning), whereas steam turbines, as the name implies, are operated by steam heated to high pressure.

Vital parts of a gas turbine unit include at least one compressor step, a combustion chamber, at least one turbine step and a generator. In many cases it is advantageous for the actual turbine step to be in several steps in order to enable optimal utilization of the thermal energy. Each step is dimensioned for the pressure the gas has in the relevant part of the turbine. Typically a high and a low pressure part are used, or a high, an intermediate and a low pressure part. The compressor may also be designed in several steps, normally two. The pressure in the compressor step is adjusted in order to obtain optimal combustion. The air entering the combustion chamber is pre-heated.

Vital parts of a steam turbine unit include a combustion or reactor hearth, steam generator, steam turbine and an electric generator. The steam generator consists typically of steel pipes with water circulating in them, which pipes are located in the hearth in order to obtain optimal heat transfer. The steam, heated to high temperature and high pressure, is conveyed to the turbine. The steam turbine can also advantageously be divided into various sections in the same way as described above, depending on pressure.

In order to achieve the highest possible efficiency, a combination of both these turbine types is advantageously used in two steps, i.e. a combined cycle power plant. For example, a gas turbine power plant which generates most of its power via a gas turbine, is supplemented by a steam generator which utilizes residual heat in the waste gases after the last turbine step, thus obtaining additional energy yield. A coal power plant of PFBC (Pressurized Fluidized Bed Combustion) type, which today represents the best that can be achieved as regards efficiency and environmentally friendly combustion of coal, generates the majority of its electric energy via a steam generator in the hearth. The combustion gases, somewhat cooled after the steam generation, are conveyed to a gas turbine after dust separation.

Many power plants are also used for district heating and in many cases an extremely high degree of total efficiency is attainable.

Examples of relevant plant types are described below. A gas turbine in these plants is fired with gas (preferably natural gas), oil or a combination of gas and oil.

Gas Turbine Power Plant

A plant consisting of one or more units, each comprising one gas turbine and associated generator.

Combined Cycle Multi-Shaft Gas Turbine Power Plant

A plant consisting of one or more units, each comprising a gas turbine and associated electric generator, in which the hot gases from the gas turbines are conveyed to a heat exchanger for steam generation. The steam drives a steam turbine and associated electric generator.

Combined Cycle Single-Shaft Gas Turbine Power Plant

A plant consisting of one or more units, each comprising a gas turbine and associated electric generator, in which the hot gases from the gas turbines are conveyed to a heat exchanger for steam generation. The steam drives a steam turbine connected to the "free end" of one of the gas turbines.

Steam Power Plant

A plant in which a combustion process (such as oil, coal, PFBC, bio-fuel) via a steam generator (pipes conveying water which are located in the hearth) generates a steam pressure which drives a steam turbine and associated electric generator.

Nuclear Power Plant

A plant similar to the steam power plant but with the steam generator located in a nuclear reactor hearth.

Common to all the power plants described above is the connection of an electric generator via a common shaft, or via a gear, to the turbine for conversion to electric power. An electric generator may also be connected to two turbines. The conversion usually takes place in a synchronous generator which can be used for generating reactive power as well as for converting active power. Usually these are 2-pole or 4-pole electric generators of turbo-generator type, but other pole numbers and embodiments exist. A typical voltage range for today's generators is 10–30 kV.

An intermediate unit is used to enable reliable connection of the generator to an out-going power network. As is clear from FIG. 3, insulated busbar systems run from the output terminal or the generator 100 to a generator breaker with isolator 107. The busbar systems continue to an auxiliary power transformer 109 and to a step-up transformer 106.

The two oil-filled transformers are normally placed outdoors because of the risk of explosion. Some form of explosion-proof wall is also often used to protect the plant. Connection to the out-going network 110 is via another breaker and isolator 108 in a high-voltage switchgear outside the plant. This switchgear 19 preferably common to several units in the plant.

An alternative to allowing the step-up transformer 106 of each generator 100 be connected directly to the out-going power network 110 is to use the step-up transformer to transform the generator voltage to an intermediate voltage level and then connect this intermediate voltage level via a system transformer to the out-going power network 110. In a limited area or a plant with several units, this may offer a cheaper total solution, particularly if the power in each unit is slight in relation to the voltage level of the out-going power network.

The drawbacks of the above solutions are related to the low voltage level (10–30 kV) of the generator. The busbar systems must be dimensioned with a large copper area to keep down the losses. The generator breaker 107 becomes large and expensive in order to break the high currents resulting from the low voltage. The step-up transformer 106 is expensive and also constitutes a safety risk. It also causes deteriorated efficiency.

The magnetic circuit in individual electric generators usually comprises a laminated core, e.g. of sheet steel with a welded construction. To provide ventilation and cooling the core is often divided into stacks with radial and/or axial ventilation ducts. For larger machines the laminations are punched out in segments which are attached to the frame of the machine, the laminated core being held together by pressure fingers and pressure rings. The winding of the magnetic circuit is disposed in slots in the core, the slots generally having a cross section in the shape of a rectangle or trapezium.

In multi-phase electric generators the windings are made as either single or double layer windings. With single layer windings there is only one coil side per slot, whereas with double layer windings there are two coil sides per slot. By coil side is meant one or more conductors combined vertically or horizontally and provided with a common coil insulation, i.e. an insulation designed to withstand the rated voltage of the generator to earth.

Double-layer windings are generally made as diamond windings whereas single layer windings in the present context can be made as diamond or flat windings. Only one (possibly two) coil width exists in diamond windings whereas flat windings are made as concentric windings, i.e. with widely varying coil width. By coil width is meant the distance in arc dimension between two coil sides pertaining to the same coil.

Normally all large machines are made with double-layer winding and coils of the same size. Each coil is placed with one side in one layer and the other side in the other layer. This means that all coils cross each other in the coil end. If there are more than two layers these crossings complicate the winding work and the coil end is less satisfactory.

It is considered that coils for rotating generators can be manufactured with good results within a voltage range of 10–20 kV.

Attempts to develop the generator for higher voltages however, however, been in progress for a long time. This is obvious, for instance from "Electrical World", Oct. 15, 1932, pages 524–525. This describes how a generator designed by Parson 1929 was arranged for 33 kV. It also describes a generator in Langerbrugge, Belgium, which produced a voltage of 36 kV. Although the article also speculates on the possibility of increasing voltage levels still further, the development was curtailed by the concepts upon which these generators were based. This was primarily because of the shortcomings of the insulation system where varnish-impregnated layers of mica oil and paper were used in several separate layers.

Some attempts at a new approach as regards the design of synchronous generators are described, for instance, in an article "Water-and-oil-cooled Turbo-generator TVM-300" in J. Elektrotechnika, No. 1, 1970, pages 6–8 in U.S. Pat. No. 4,429,244 "Stator of generator" and in Russian patent specification CCCP Parent 955369.

The water-and-oil-cooled synchronous machine described in J. Elektrotechnika is intended for voltages of up to 20 kV. The article describes a new insulation system consisting of oil/paper insulation, allowing the stator to be entirely immersed in oil. The oil can then be used as coolant while also serving as insulation. To prevent oil in the stator from leaking out to the rotor, a dielectric-oil-separating ring is provided at the internal surface of the core. The stator winding is manufactured from conductors with an oval, hollow shape, provided with oil and paper insulation. The coil sides with their insulation are retained in the slots formed with rectangular cross section by means of wedges. Oil is used as coolant both in the hollow conductors and in apertures in the stator walls. However, such cooling systems entail a large number of connections for both oil and electricity at the coil ends. The thick insulation also causes increased radius of curvature on the conductors, which in turn results in increased size for the coil overhang.

The above-mentioned US patent relates to the stator part of a synchronous machine comprising a magnetic core of laminated plate with trapezium-shaped slots for the stator winding. The slots are stepped since the need for insulation in the stator winding is less in towards the rotor where the part of the winding nearest the neutral point is located. The stator part also includes a dielectric oil-separating cylinder nearest the inner surface of the core. This part may require more excitation than a machine without this ring. The stator winding is manufactured from oil-saturated cables having the same diameter for each coil layer. The layers are separated from each other by means of spacer elements in the slots, and secured with wedges. Specific to the winding is that it consists of two so-called half-windings connected in series. One of these two half-windings is placed centrally inside an insulating sleeve. The conductors of the stator winding are cooled by the surrounding oil. A drawback with so much oil in the system is the risk of leakage and the major clean-up work necessary after a fault condition. The parts of the insulation sheath located outside the slots have a cylindrical part and a conical screen electrode, the purpose of which is to control the electric field strength in the area where the cable leaves the laminations.

CCCP 955369 reveals in another attempt to increase the rated voltage of the synchronous machine, that the oil-cooled stator winding consists of a high-voltage cable having the same dimension for all layers. The cable is placed in stator slots shaped as circular, radially located openings corresponding to the cross-sectional area of the cable and space required for fixing and coolant. The various radially placed layers of the winding are surrounded by and secured in insulating tubes. Insulating spacer elements fix the tubes in the stator slot. Here too, because of the oil cooling, an inner dielectric ring is required to seal the oil coolant from the inner air gap. The construction shows no stepping of the insulation or of the stator slots. The design shows a very small radial waist between the various stator slots, entailing a large slot stray flux which strongly affects the excitation requirement of the machine.

In a report from the Electric Power Research Institute, EPRI, EL-3391 from April 1984, an account is given of generator concepts for achieving higher voltage in an electric generator with the object of being able to connect such a generator to a power network without intermediate transformers. Such a solution is assessed in the report to offer good gains in efficiency and considerable financial advantages. The main reason that it was deemed possible in 1984 to start developing generators for direct connection to power networks was that a supra-conducting rotor had been developed at that time. The considerable excitation capacity of the supra-conducting field enables the use of airgap-winding with sufficient thickness to withstand the electrical stresses.

By combining the concept deemed most promising according to the project, that of designing a magnetic circuit with winding, known as "monolithe cylinder armature", a concept in which two cylinders of conductors are enclosed in three cylinders of insulation and the whole structure is attached to an iron core without teeth, it was assessed that a rotating electric machine for high voltage could be directly connected to a power network. The solution entailed the main insulation having to be made sufficiently thick to withstand network-to-network and network-to-earth potentials. Obvious drawbacks with the proposed solution, besides its demanding a supra-conducting rotor, are that it also requires extremely thick insulation, which increases the machine size. The coil ends must be insulated and cooled with oil or freones in order to control the large electric fields at the ends. The whole machine must be hermetically enclosed in order to prevent the liquid dielectric medium from absorbing moisture from the atmosphere.

DESCRIPTION OF THE INVENTION

Against this background the object of the invention is to provide a plant comprising at least one generator for such a high voltage that the step-up transformer becomes superfluous. The generator breaker then also becomes superfluous. Functionally this is replaced by the already existing high-voltage breaker. The busbar system is replaced with screened high-voltage cable. It is thus an object of the invention to connect the electric generators in a power plant directly to the out-going power network.

This object has been achieved according to the invention from a first aspect in that a plant of the type described in the preamble to claim 1 comprises the special features defined in the characterizing part of this claim, from a second aspect in that a generator of the type described in the preamble to claim 29 comprises the special features defined in the characterizing part of this claim, and through the procedure described in claim 31.

Thanks to this design of the insulation system for the winding, the decomposition of the insulation is avoided which tends to appear in the relatively thick-walled insulating layers used conventionally for high-voltage generators, e.g. impregnated layers of mica tape, which decomposition is in some part caused by partial discharges, PD. Inner corona discharges occur in cavities, pores and the like which are present in these conventional insulations, and which arise during manufacture, when the insulation is subjected to excessive electrical field strengths. These corona discharges gradually break down the material and may result in electrical disruptive discharge through the insulation. Other defects, cracks or the like, occurring at thermal movement in the winding are avoided, thanks to the temperature coefficients of the layers being substantially equal. These problems constitute an important reason for it having been impossible to design generators for the voltage range above 36 kV previously.

This problem has been eliminated by the insulation system according to the invention. The insulation system according to the invention can be achieved by using layers for the insulation which are manufactured in such a way that the risk of cavities and pores is minimal, e.g. extruded layers of suitable permanent insulating material, such as PEX, thermo-plastics, including cross-linked thermo-plastics, EP rubber, other types of rubber, etc. By using only insulating layers which can be produced with a minimum of defects and also providing the insulation with an inner and an outer semiconducting part, it can be ensured that the thermal and electrical loading is reduced. In the event of temperature gradients, the insulating part with semiconducting layers will constitute a monolithic part and defects caused by different expansion due to temperature in the insulation and surrounding layers will not occur. The electrical load on the material decreases as a result of the semiconducting parts around the insulation constituting equipotential surfaces and of the electrical field in the insulation part thus being distributed uniformly over the thickness of the insulation. The outer semiconducting layer can be connected to earth potential. This means that, for such a cable, the outer sheath of the winding can be maintained at earth potential along its entire length.

The special features of a plant according to the invention, particularly as relating to the insulation system for the winding in the generator stator, have thus eliminated the obstacles preventing an increase in voltage level, and enable elimination of the step-up transformer even for voltages above 36 kV, with the associated advantages.

In the first place the mere absence of a transformer entails great savings in weight, space and expense.

When the transformer, as is often the case, is arranged at a distance from the turbine hall, busbars are required to connect generator and transformer. The need for these is thus also eliminated which saves not only the expense and space they require the power losses in these, which are considerable since the current is high, also disappear in busbar systems 2-phase and 3-phase faults can occur and the breakers and isolators required therefor demand a high level of maintenance. By the present invention the risk for these faults has been greatly reduced.

The fire risk entailed with an oil-insulated transformer is also reduced, thereby reducing the necessity for safety precautions against fire.

The turbo-generator plant according to the invention also has the advantage that it can be arranged with several connections to different voltage levels.

In all, the advantages mentioned above constitute radically improved total economy for the plant. The costs of building the plant are dramatically reduced and operating economy is improved by less need of service and maintenance and by an increase in the efficiency of approximately 0.5–1.5%.

The invention is also applicable and entails advantages for a turbo-generator for peak loads, used as synchronous compensator when necessary, so that the generator is disconnected from the turbine.

The purpose of the invention is also that auxiliary power shall be generated by the generator by means of an auxiliary power winding inserted in its stator, which gives considerably lower voltage than is generated by the main winding of the generator.

To accomplish this the magnetic circuit in the generator or generators included in the turbo-generator plant is formed with threaded permanent insulating cable with included earth.

The major and essential difference between known technology and the embodiment according to the invention is thus that this is achieved with a magnetic circuit included in an electric generator which is arranged to be directly connected via possible breakers and isolators to a high supply voltage in the vicinity of between 20 and 800 kV, preferably higher than 36 kV. The magnetic circuit thus comprises a laminated core having at least one winding consisting of a threaded cable with one or more permanently insulated conductors having a semiconducting layer both at the conductor and outside the insulation, the outer semiconducting layer being connected to earth potential.

To solve the problems arising with direct connection of electric machines to all types of high-voltage power networks, the generator in the plant according to the invention has a number of features as mentioned above, which differ distinctly from known technology. Additional features and further embodiments are defined in the dependent claims and are discussed in the following.

Such features mentioned above and other essential characteristics or the generator and thus of the turbo-generator plant according to the invention include the following:

The winding of the magnetic circuit is produced from a cable having one or more permanently insulated conductors with a semiconducting layer at both conductor and sheath. Some typical conductors of this type are PEX cable or a cable with EP rubber insulation which, however, for the present purpose are further developed both as regards the strands in the conductor and the nature of the outer sheath. PEX crosslinked polyethylene (XLPE) EP=ethylene propylene.

Cables with circular cross section are preferred, but cables with some other cross section may be used in order to obtain better packing density, for instance.

Such a cable allows the laminated core to be designed according to the invention in a new and optimal way as regards slots and teeth.

The winding is preferably manufactured with insulation in steps for best utilization of the laminated core.

The winding is preferably manufactured as a multi-layered, concentric cable winding, thus enabling the number of coil-end intersections to be reduced.

The slot design is suited to the cross section of the winding cable so that the slots are in the form of a number of cylindrical openings running axially and/or radially outside each other and having an open waist running between the layers of the stator winding.

The design of the slots is adjusted to the relevant cable cross section and to the stepped insulation of the winding. The stepped insulation allows the magnetic core to have substantially constant tooth width, irrespective of the radial extension.

The above-mentioned further development as regards the strands entails the winding conductors consisting of a number of impacted strata/layers, i.e. insulated strands that from the point of view of an electric machine, are not necessarily correctly transposed, uninsulated and/or insulated from each other.

The above-mentioned further development as regards the outer sheath entails that at suitable points along the length of the conductor, the outer sheath is cut off, each cut partial length being connected directly to earth potential.

The use of a cable of the type described above allows the entire length of the outer sheath of the winding, as well as other parts of the plant, to be kept at earth potential. An important advantage is that the electric field is close to zero within the coil-end region outside the outer semiconducting layer. With earth potential on the outer sheath the electric field need not be controlled. This means that no field concentrations will occur either in the core, in the coil-end regions or in the transition between them.

The mixture of insulated and/or uninsulated impacted strands, or transposed strands, results in low stray losses.

The cable for high voltage used in the magnetic circuit winding is constructed of an inner core/conductor with a plurality of strands, at least two semiconducting layers, the innermost being surrounded by in insulating layer, which is in turn surrounded by an outer semiconducting layer having an outer diameter in the order of 20–200 mm and a conductor area in the order of 50–3000 mm$^2$.

Since the generator in a plant according to the invention is manufactured with the special insulation system, the stator need not be completed at the factory but can instead be delivered divided axially into sections and the winding threaded on site. This naturally gives obvious financial advantages from the transport point of view.

The invention thus also relates to a procedure in which this possibility is exploited.

From another aspect of the invention, the objectives listed have been achieved in that a plant of the type described in the preamble to claim 29 is given the special features defined in the characterizing part of this claim.

Since the insulation system, suitably permanent, is designed so that from the thermal and electrical point of view it is dimensioned for over 36 kV, the plant can be connected to high-voltage power networks without any intermediate step-up transformer, thereby achieving the advantages referred to. Such a plant is preferably, but not necessarily, constructed to include the features defined for the plant as claimed in any of claims 1–28.

The above-mentioned and other advantageous embodiments of the invention are defined in the dependent claims.

BRIEF DESCRIPTION OF THE DRAWINGS

The invention will be described in more detail in the following detailed description of a preferred embodiment of the construction of the magnetic circuit of the electric generator in the turbo-generator plant, with reference to the accompanying drawings in which.

DESCRIPTION OF THE INVENTION

Figure 1:
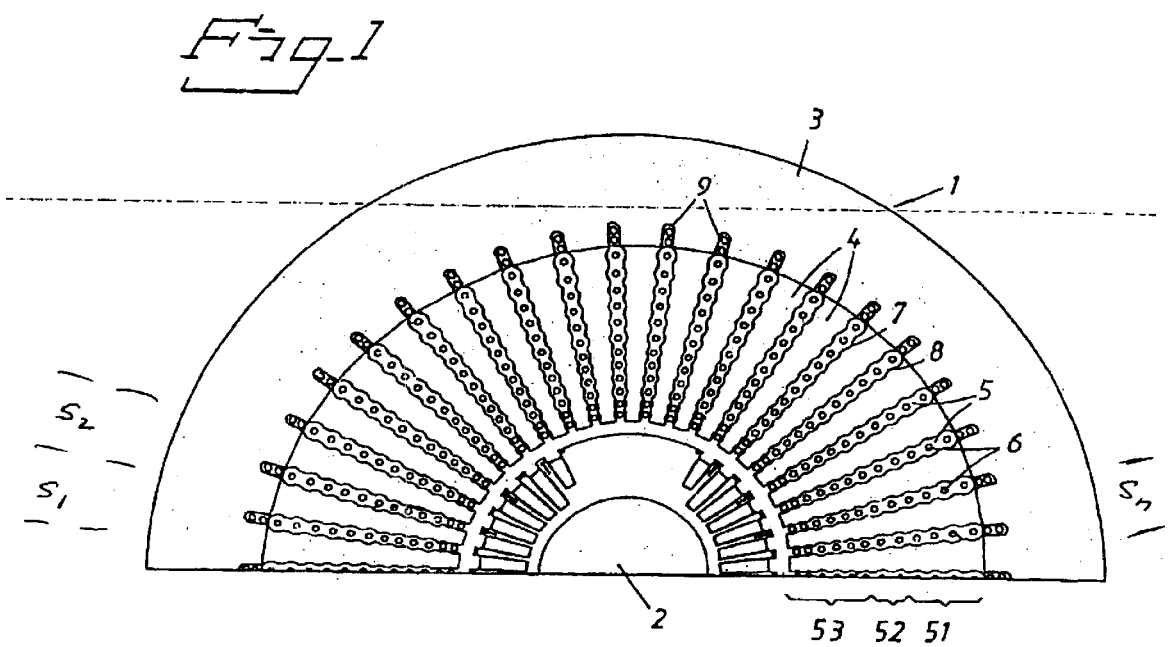
FIG. 1 shows a schematic axial end view of a sector of the stator in an electric generator in the turbo-generator plant according to the invention.

In the schematic axial view through a sector of the stator 1 according to FIG. 1, pertaining to the generator or generators included in the turbo-generator plant, the rotor 2 of the generator is also indicated. The stator 1 is composed in conventional manner of a laminated core. The yoke may be formed of Sections $S_1, S_2 \ldots S_n$ which may be assembled in-situ i.e., where the generator is to be used. FIG. 1 shows a sector of the generator corresponding to one pole pitch. From a yoke part 3 of the core situated radially outermost, a number of teeth 4 extend radially in towards the rotor 2 and are separate by slots 5 in which the stator winding is arranged. Cables 6 forming this stator winding, are high-voltage cables which may be of substantially the same type as those used for power distribution, i.e., PEX cables. One difference is that the outer, mechanically-protective sheath, and the metal screen normally surrounding such power distribution cables are eliminated so that the cable for the present application comprises only the conductor and at least one semiconducting layer on each side of an insulating layer. Thus, the semiconducting layer which is sensitive to mechanical damage lies naked on the surface of the cable.

The cables 6 are illustrated schematically in FIG. 1, only the conducting central part of each cable part or coil side being drawn in. As can be seen, each slot 5 has varying cross section with alternating wide parts 7 and narrow parts 8. The wide parts 7 are substantially circular and surround the cabling, the waist parts between these forming narrow parts 8. The waist parts serve to radially fix the position of each cable. The cross section of the slot 5 also narrows radially inwards. This is because the voltage on the cable parts is lower the closer to the radially inner part of the stator 1 they are situated. Slimmer cabling can therefore be used there, whereas coarser cabling is necessary further out. In the example illustrated cables of three different dimensions are used, arranged in three correspondingly dimensioned sections 51, 52, 53 of slots 5. An auxiliary winding 9 may be employed in the outer end of the slot 5 as shown.

Figure 2:
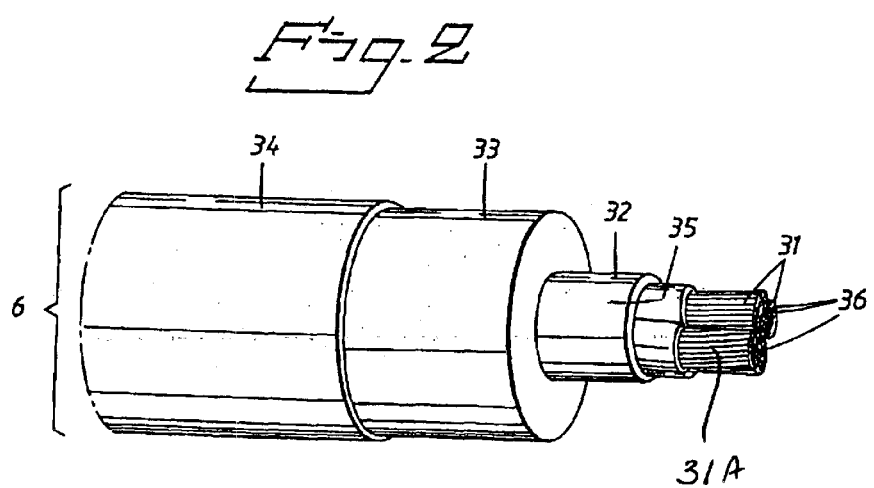
FIG. 2 shows an end view, step-stripped, of a cable used in the winding of the stator according to FIG. 1.

FIG. 2 shows a step-wise stripped end view of a high-voltage cable for use in an electric machine according to the present invention. The high-voltage cable 6 comprises one or more conductors 31, each of which comprises a number of strands 36 which together give a circular cross section of copper (Cu), for instance. These conductors 31 are arranged in the middle of the high-voltage cable 6 and in the shown embodiment each is surrounded by a part insulation 35. However, it is feasible for the part insulation 35 to be omitted on one of the conductors 31. In the present embodiment of the invention the conductor 31 are together surrounded by a first semiconducting layer 32. Around this first semiconducting layer 32 is an insulating layer 33, e.g. PEX insulation, which is in turn surrounded by a second semiconducting layer 34. Thus the concept "high-voltage cable" in this application need not include any metallic screen or outer sheath of the type that normally surrounds such a cable for power distribution. The conductors 31 include one or more uninsulated strands 31A.

Figure 3:
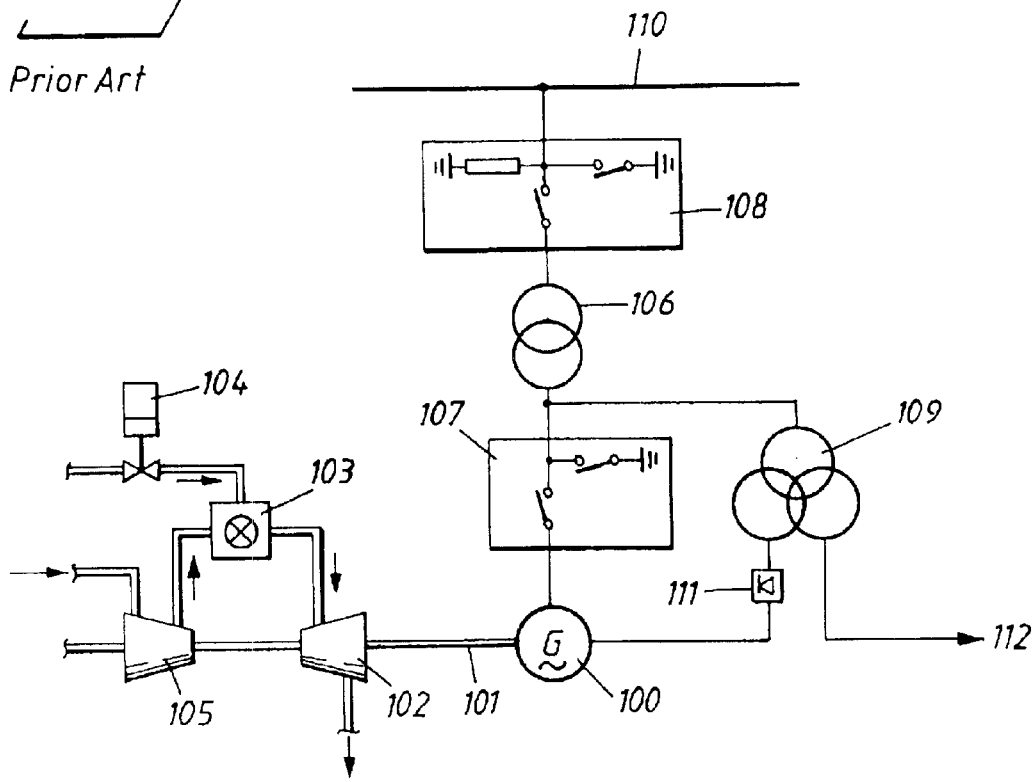
FIG. 3 shows a schematic diagram for a turbo-generator arrangement according to known technology.

A turbo-generator plant constructed in accordance with known technology is shown in FIG. 3 where a generator 100, as already described in the introduction, is driven by a gas turbine 102 via a common shaft 101. The gas turbine is driven by gas from a combustion chamber 103 controlled by a control device 104 and supplied by a compressor 105. The compressor 105 is arranged on the same shaft 101 as the generator 100 and gas turbine 102.

In the known turbo-generator plant the generator 100 normally generates a voltage of maximally 25–30 kV. To supply a high-voltage distribution or transmission network 110, normally supplying voltages of up to 800 kV, the output voltage from the known generator 100 must be stepped up, as illustrated by the step-up transformer 106. This also requires a generator breaker 107 to be connected between the generator 100 and the step-up transformer 106, which generator breaker comprises at least one set of isolators, power breakers and earth connectors.

Connection to the distribution or transmission network 110 is via additional isolators, breakers and flashover protection, here jointly designated 108.

The output voltage of the generator, lying at a medium voltage level of 25–30 kV, Is usually also branched off to a step-down transformer 109. The step-down transformer 109 supplies the generator 100 with excitation voltage via a rectifier circuit 111 and is also able to generate low voltage 112 for other requirements.

Figure 4:
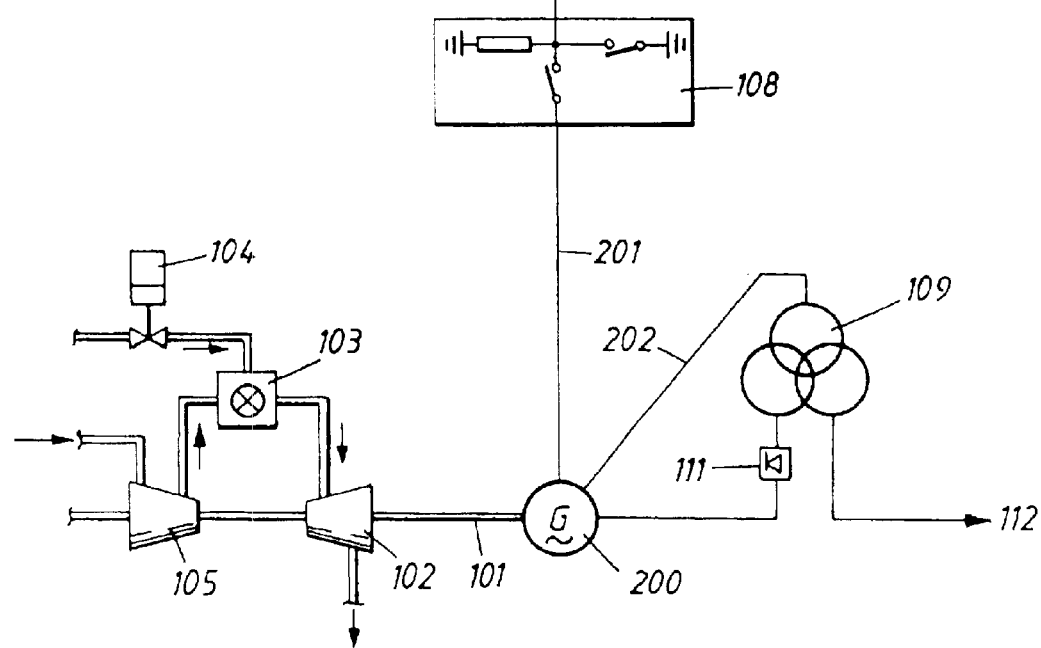
FIG. 4 shows a schematic diagram for a turbo-generator arrangement utilizing the present invention.

FIG. 4 shows the same plant as in FIG. 3 but utilizing a turbo-generator arrangement according to the present invention. With the invention, the generator 200 which generates the same high voltage (up to approximately 800 kV) as that for which the distribution or transmission network 110 is intended, is directly connected to this distribution or transmission network 110 via conduit 201. There is thus no need for any step-up transformer or generator breaker (106, 107 in FIG. 3).

The step-down transformer 109 shown in FIG. 4 is supplied from a separate output on the stator winding of the generator 200 for supply of the excitation voltage via the conduit 202 and the rectifier circuit 111, as well as for any other requirement via conduit 112.

Figure 5:
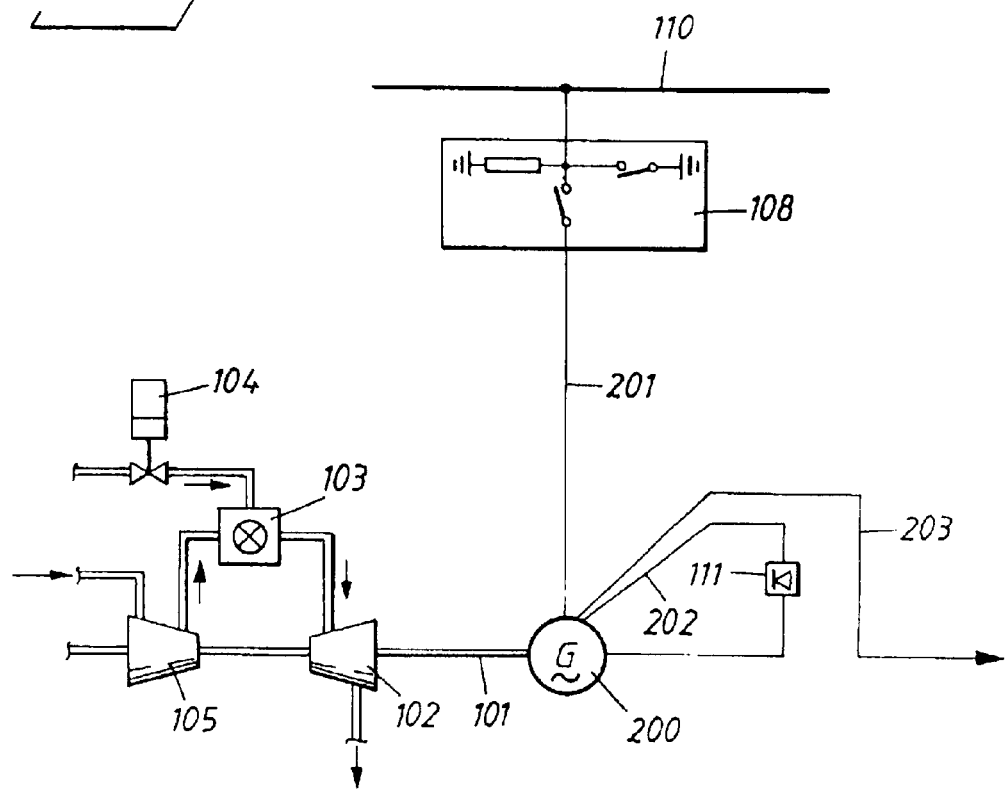
FIG. 5 shows a schematic diagram for a modified embodiment of the turbo-generator arrangement according to the invention.

As can be seen in FIG. 5, the step-down transformer 109 may also be omitted when using a generator 200 constructed in accordance with the invention. The stator winding of the generator 200 (compare FIG. 1) is thus provided with separate outputs for the excitation voltage via conduit 202 and the rectifier circuit 111, as well as for any other requirement via the conduit 203. In accordance with the invention, the various voltage levels are readily controllable plus and minus 20% of the rated voltage.

Figure 6:
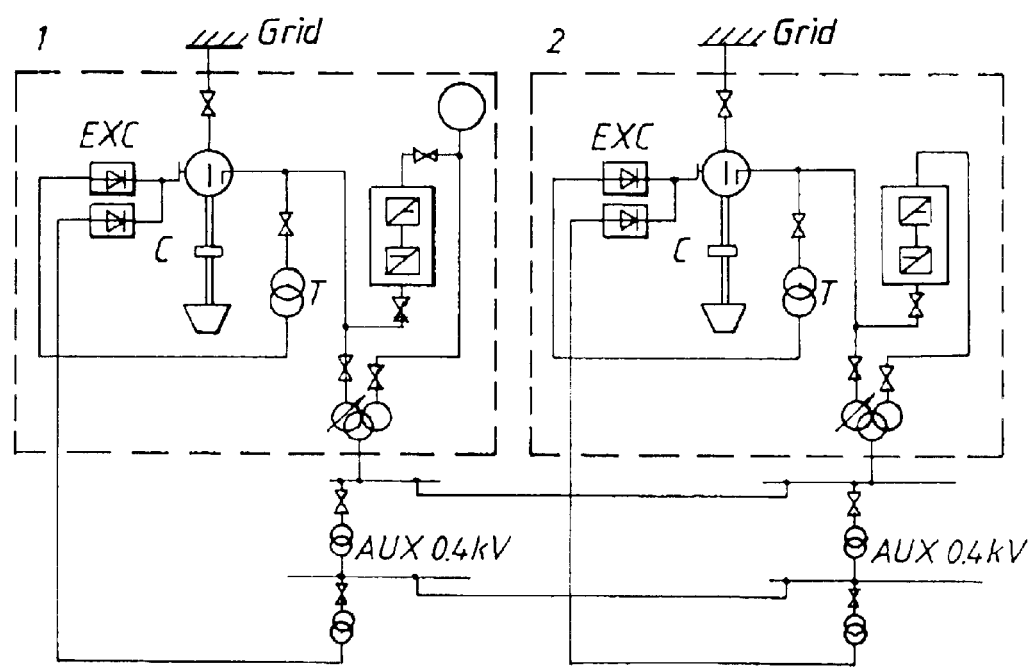
FIG. 6 is a diagram showing a generator according to the invention with build-in windings for generation of auxiliary power and frequency converter starting in a single shaft generator plant.

FIG. 6 shows a schematic block diagram of a generator according to the invention in which a plurality of gas turbine operated electrical generators are directly connected to the grid. In the embodiment illustrated, each electrical generator is connected to a gas turbine by a single shaft. Each generator also has an auxiliary winding which is coupled to an auxiliary bus as shown.

With the turbo-generator arrangement according to the present invention, therefore, several transformer and breaker units that were previously necessary are eliminated which is obviously advantageous—not least from the expense and operating reliability aspects.

What is claimed is:

1. A plant for generating active and reactive electric power for a high-voltage distribution or transmission network, comprising at least one of a gas and steam turbine coupled via a shaft means to at least one electric generator for generating a high voltage, said electric generator including at least one flexible winding comprising a conductor formed of a plurality of insulated strands and a lesser plurality of uninsulated strands, an insulation system including an inner semiconducting layer surrounding the conductor, a solid insulation surrounding the inner semiconducting layer and an outer semiconducting layer surrounding the solid insulation layer, said inner layer and said outer layer each forming an equipotential surface.

2. The plant as claimed in claim 1, wherein the generator comprises a magnetic circuit with a magnetic core.

3. The plant as claimed in claim 2, wherein the flux paths in the core of the magnetic circuit comprise at least one of laminated sheet and cast iron and power-based iron and forged iron.

4. The plant as claimed in claim 1, wherein the winding comprises a high voltage cable including one or more of said current-carrying conductors surrounded by the solid insulation.

5. The plant as claimed in claim 4, wherein the inner semiconducting layer is in electrical contact with a selected plurality of the conductors and is at substantially the same potential as said selected plurality of conductors.

6. The plant as claimed in claim 4, wherein the equipotential surface formed by the outer semiconducting layer surrounds the conductor and solid insulation.

7. The plant as claimed in claim 6, wherein said outer semiconducting layer is connected to a selected potential.

8. The plant as claimed in claim 7, wherein the selected potential is earth potential.

9. The plant as claimed in claim 4, wherein at least one of said inner and outer semiconducting layers form a monolithic structure with the solid insulation having substantially the same coefficient of thermal expansion.

10. The plant as claimed in claim 1, wherein at least one electric generator is arranged to supply the out-going electric network directly without any intermediate connection of a step-up transformer.

11. The plant as claimed in claim 1, wherein at least one generator is arranged to supply an out-going network comprising at least 2 part-networks, at least one part-network being supplied via an intermediate system transformer.

12. The plant as claimed in claim 1, comprising several generators, each of which lacks an individual step-up transformer but which, via a system transformer common to the generators, is connected to the transmission or distribution network.

13. The plant as claimed in claim 1, wherein the windings of the stator in at least one generator are arranged for connection to more than one voltage level.

14. The plant as claimed in claim 1, including a separate winding in the generator for generating auxiliary power.

15. The plant as claimed in claim 1, wherein at least one generator is earthed via an impedance.

16. The plant as claimed in claim 1, wherein at least one generator is directly earthed.

17. The plant as claimed in claim 1, wherein the stator of the generator is cooled at earth potential by means of a flow of gas and/or liquids.

18. The plant as claimed in claim 1, wherein at least one winding comprises a flexible for high voltage having a conductor area of between about 50 and 3000 mm2 and having an outer diameter of between about 20 and 250 mm.

19. The plant as claimed in claim 1 wherein the at least one winding comprises a fractional slot winding.

20. The plant as claimed in claim 1, wherein the rotor of at least one generator comprises at least one of 2 and 4 poles.

21. The plant as claimed in claim 1, wherein the voltage level is controllable +−20% of the rated voltage.

22. The plant as claimed in claim 1, wherein the winding of the generator is arranged for self-regulating field control free of auxiliary means for control of the field.

23. The plant as claimed in claim 1, wherein the stator of at least one generator is composed of axially combined, plate-shaped sections, preferably as whole sections in the peripheral direction.

24. A plant for generating active and reactive electric power for a high-voltage distribution or transmission network, including at least one electric generator which is coupled to at least one of a gas or-a steam turbine via a shaft means said at least one electric generator including at least one flexible winding, wherein at least one winding comprises conductor formed of a plurality of conductive insulated strands, and a lesser plurality of uninsulated strands and an insulation system including an inner layer having semiconducting properties surrounding and being in contact with the conductor, a solid insulation surrounding the inner layer and an outer layer having semiconducting properties surrounding the solid insulation, said winding being-operable in excess of 36 kV.

25. An electric generator arranged to be coupled to at least one of a gas and a steam turbine via a shaft means and comprising at least one flexible winding, wherein the winding comprises a conductor formed of a plurality of conductive insulated strands and a lesser plurality of uninsulated strands, a solid insulation system surrounding the conductor including an inner layer having semiconducting properties surrounding the conductor, a solid insulation surrounding the inner layer and an outer layer having semiconducting properties surrounding the solid insulation each of said inner and outer layers forming an equipotential surface, and wherein at least one of the inner and outer layers forms a monolithic structure with the solid insulation having substantially the same coefficient of thermal expansion.

26. A procedure for manufacturing an electric generator as claimed in claim 25, wherein the stator is wound in-situ where the generator is to be used.

27. The procedure as claimed in claim 26, wherein the stator is manufactured at the factory axially divided into a plurality of plate-shaped, separate sections, each section preferably being manufactured as a whole section in the peripheral direction.

28. A plant for generating active and reactive power of high-voltage distribution including at least one rotating high voltage electric machine comprising a stator; a rotor and a winding, wherein said winding comprises a flexible cable including at least one current-carrying conductor including a plurality of insulated strands and at least one uninsulated strand and an insulation system surrounding the conductor, said insulation system comprising an inner layer having semiconducting properties surrounding and being in contact with the uninsulated conductor, a solid insulation surrounding the inner layer and an outer layer having semiconducting properties surrounding the solid insulation, said cable forming at least one uninterrupted turn in the corresponding winding of said machine.

29. The plant of claim 28, wherein the cover comprises an insulating layer surrounding the conductor and an outer layer surrounding the insulating layer, said outer layer having a conductivity for establishing an equipotential surface around the conductor.

30. The plant of claim 28, wherein the cover comprises an inner layer surrounding the conductor and being in electrical contact therewith; an insulating layer surrounding the inner layer and an outer layer surrounding the insulating layer.

31. The plant of claim 30, wherein the inner and outer layer have semiconducting properties.

32. The plant of claim 28, wherein the cover is formed of a plurality of layers including an insulating layer and wherein said plurality of layers form a monolithic structure being substantially void free.

33. The plant of claim 28, wherein the cover is in electric contact with the uninsulated strands of the conductor.

34. The plant of claim of 28, wherein the layers of the cover form a monolithic structure having substantially the same temperature coefficient of expansion.

35. The plant of claim 28, wherein the layers of the cover form a monolithic structure having substantially the same temperature coefficient of expansion such that the machine is operable at 100% overload for two hours.

36. The plant of claim 28, wherein the cover is operable to render the cable free of sensible end winding loss.

37. The plant of claim 28, wherein the cover is operable to render the cable free of partial discharge and field control.

38. The plant of claim 28, wherein the winding comprises multiple uninterrupted turns.

* * * * *